United States Patent
Muckenhirn et al.

(10) Patent No.: US 6,390,622 B1
(45) Date of Patent: May 21, 2002

(54) CONTACT LENS OR INTRAOCULAR LENS HAVING NEAR AND DISTANCE ZONES

(75) Inventors: Stefan Muckenhirn, Au; Dieter Muckenhirn, Wittnau; Frank Widmer, Horben, all of (DE)

(73) Assignee: Hecht Contactlinsen GmbH, Au (DE)

( * ) Notice: Subject to any disclaimer, the term of this patent is extended or adjusted under 35 U.S.C. 154(b) by 0 days.

(21) Appl. No.: 09/618,829

(22) Filed: Jul. 18, 2000

(30) Foreign Application Priority Data

Jul. 19, 1999 (DE) .......................... 199 33 775

(51) Int. Cl.$^7$ ................................ G02C 7/04
(52) U.S. Cl. ........................ 351/161; 623/6.28
(58) Field of Search .................... 351/161, 160 R, 351/160 H, 162, 168, 176; 623/6.24, 6.27–6.28

(56) References Cited

U.S. PATENT DOCUMENTS

| | | | |
|---|---|---|---|
| 4,199,231 A | 4/1980 | Evans | 351/160 H |
| 4,636,049 A | 1/1987 | Blaker | 351/161 |
| 4,861,152 A | 8/1989 | Vinzia et al. | 351/161 |
| 5,106,180 A * | 4/1992 | Marie et al. | 351/161 |
| 5,526,071 A | 6/1996 | Seidner et al. | 351/161 |
| 5,691,797 A | 11/1997 | Seidner et al. | 351/161 |
| 5,835,187 A | 11/1998 | Martin | 351/161 |

FOREIGN PATENT DOCUMENTS

| | | |
|---|---|---|
| EP | 0 138 394 A | 4/1985 |
| EP | 0 741 314 | 6/1996 |
| GB | 2 288 033 A | 10/1995 |

OTHER PUBLICATIONS

Davies, et al. "The Correction of Presbyopia with Soft Contact Lenses", Contact Lenses Monthly—Jan. 5, 1990.
Bronstein et al, "Taschenbuch Der Mathematik" pp. 176–177 (1967) with specific reference being made to the mathematical formulas contained therein.

* cited by examiner

*Primary Examiner*—Jordan M. Schwartz
(74) *Attorney, Agent, or Firm*—Marshall, Gerstein, & Borun

(57) ABSTRACT

A contact lens or intraocular lens is provided having a near zone (1) and a distance zone (2) concentrically surrounding the former. In order to achieve functionally correct vision, the said optimum surface consists of a bielliptical or a spheroelliptical combination.

18 Claims, 1 Drawing Sheet

CONTACT LENS OR INTRAOCULAR LENS HAVING NEAR AND DISTANCE ZONES

BACKGROUND OF THE INVENTION

The invention relates to a contact lens or intraocular lens having a near zone (or near power region, respectively) and a distance zone (or distance power region, respectively) concentrically surrounding the former.

Bifocal lenses are known for example from DE 41 25 707 C. There is the problem in such bifocal lenses to position the distance zone and the near zone always correctly in spite of the movement of the eye in order to permit functionally correct vision.

In CA 986 343 as well as in the paper by Milton M. Kaplan "The Aplanatic Contact Lense" in The Optometry Weekly, 9.2.1967, pages 25 to 29 and 16.2.1967, pages 42 to 45, aplanatic contact lenses are described.

SUMMARY OF THE INVENTION

It is an object of the invention to provide a lens of the above type which permits a high degree of functionally correct and comfortable vision.

This object is achieved by the lens characterized in claim 1. Further embodiments are presented in the dependent claims.

Further features and objects of the invention will be apparent from the description of an embodiment with reference to the drawings, wherein:

DETAILED DESCRIPTION OF THE DISCLOSED EMBODIMENT

Figure 1:
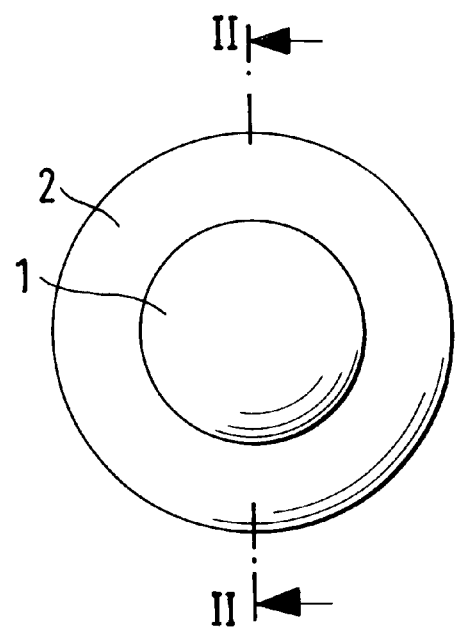
FIG. 1 is a plan view of the contact lens.
Figure 2:
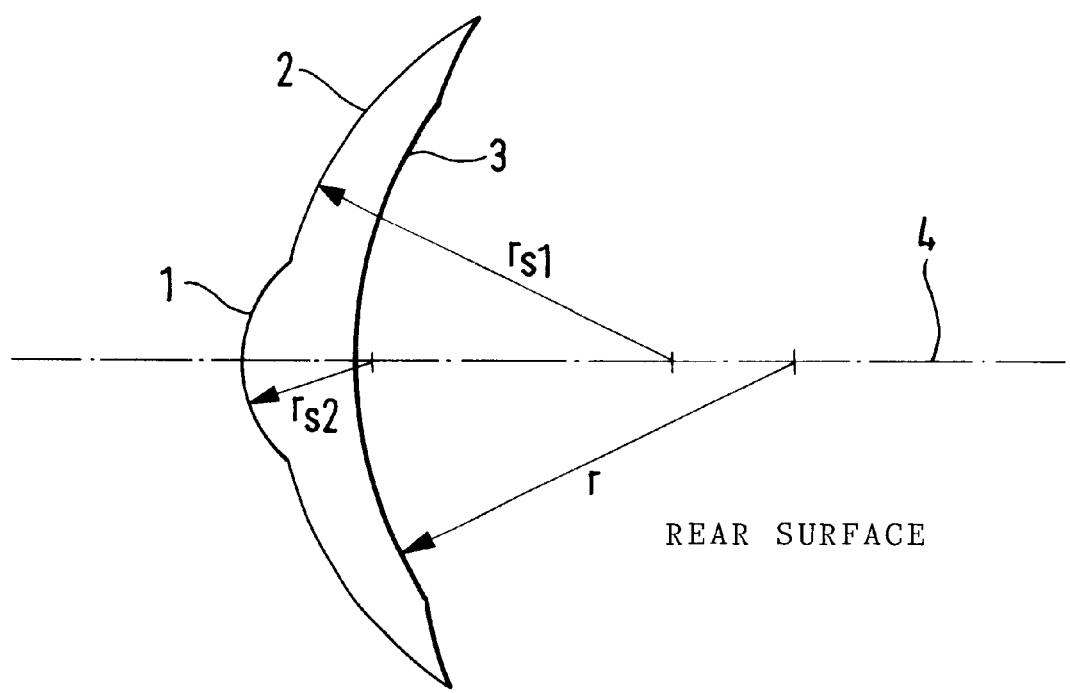
FIG. 2 is a section along line II—II in FIG. 1 on an enlarged scale.

The contact lens comprises a near zone 1 at the center of the lens and a distance zone 2 concentrically surrounding the former. The diameter of the near zone is within 1.5 and 3.5 mm, preferably within 1.8 and 3 mm, and more preferably within 2 and 2.6 mm. The outer diameter of the lens is chosen in the known fashion.

The rear surface 3 of the contact lens is formed in a conventional manner and selected such that it is adapted to the shape of the patient's cornea.

The distance zone 2 is formed as an elliptical surface where the major axis and the center of curvature are located on the optical axis 4 of the lens. The numerical eccentricity of the elliptical surface is greater than 0 and less than 1, and is preferably within 0.4 and 0.8, and more preferably within 0.5 and 0.7. The near zone 1 may be formed spherically or aspherically or aspherically-elliptically. The radius $r_{S2}$ of the near zone 1 is less than the radius $r_{S1}$ of the distance zone 2. In the near zone the major axis and the center of curvature are also located on the optical axis 4. In both cases, the eccentricity is less than for the distance zone.

When imaging an object located in the close action zone, the elliptical surface of the distance zone 2 acts as if the distance zone is provided with a close-range supplement, whereby the size of the close-range supplement operating in this manner depends on the eccentricity. The missing close-range action is achieved by the additional near zone 1. The close-range add-on device for the near zone 1 can thus be reduced by this apparent close-range supplement resulting from the distance zone for close-range vision. The smaller the radius $r_{S2}$ of the near zone 1 compared to the radius $r_{S1}$ of the distance zone 2 and the greater the diameter of the near zone 1, the greater the entire close-range action of the lens will get.

For example, if a test person requires a correction of +1 dpt. for the distance and normally a close-range supplement of 2 dpt. and if the eccentricity is selected such that the distance zone for close vision, due to the eccentricity, acts such as if it had a close-range supplement of 0.75 dpt., the supplement for the close-range zone can be attenuated by 0.75 dpt. to 1.25 dtp. in this case. This results in a substantially lesser difference between the close-range zone and the distant-range zone. Vision will be significantly more comfortable.

The above embodiment of a multifocal contact lens is appropriate for both inherently stable and soft contact lenses as well as for scleralic lenses. As an intraocular lens, it has the same structure, however, it will be formed as a bi-lens.

What is claimed is:

1. A contact lens or an intraocular lens, the lens having a near zone and a distance zone concentrically surrounding the near zone, the near zone and the distance zone each having an elliptical-aspherical surface, the near zone having an eccentricity of less than about 0.7.

2. A lens in accord with claim 1, wherein the diameter of said near zone is from about 1.5 to about 3 mm.

3. A lens in accord with claim 2, wherein the diameter of said near zone is between about 2.0 and about 2.6 mm.

4. A lens in accord with claim 1, wherein the eccentricity of the near zone is less than about 0.5.

5. A lens in accord with claim 1, wherein the distance zone includes an eccentricity, and wherein the eccentricity of the near zone is less than the eccentricity of the distance zone.

6. A contact lens or an intraocular lens, the lens having a near zone and a distance zone concentrically surrounding the near zone, the near zone having a diameter between about 1.5 mm and about 3.0 mm, the near zone and the distance zone each having an elliptical-aspherical surface, the near zone having an eccentricity less than 0.7.

7. A lens in accord with claim 6, wherein the diameter of the near zone is between about 2.0 mm and about 2.6 mm.

8. A lens having a near zone and a distance zone concentrically surrounding the near zone, wherein said distance zone comprises a surface having an eccentricity $\epsilon$ in the range $0<\epsilon<1$, the near zone including an elliptical-aspherical surface, and wherein an eccentricity of the near zone is less than about 0.7 and less than the eccentricity of the distance zone.

9. A lens in accord with claim 8, wherein the eccentricity of the distance zone is between about 0.4 and about 0.8.

10. A lens in accord with claim 9, wherein the eccentricity of the distance zone is between about 0.5 and about 0.7.

11. A lens in accord with claim 8, wherein the diameter of said near zone is from about 1.5 to about 3 mm.

12. A lens in accord with claim 11, wherein the diameter of said near zone is from about 2.0 mm to about 2.6 mm.

13. A lens in accord with claim 8, wherein the eccentricity of the near zone is less than about 0.5.

14. A lens having a near zone and a distance zone concentrically surrounding the near zone, the near zone having a diameter between about 1.5 mm and about 3.0 mm, the distance zone comprising a surface having an eccentricity $\epsilon$ in the range $0<\epsilon<1$, the near zone having an elliptical-aspherical surface, the eccentricity of the near zone being less than about 0.7, the eccentricity of the near zone also being less than the eccentricity of the distance zone.

15. A lens in accord with claim 14, wherein the diameter of the near zone is between about 2.0 mm and about 2.6 mm.

16. A lens in accord with claim 14, wherein the eccentricity of the distance zone is between about 0.4 and about 0.8.

17. A lens in accord with claim 16, wherein the eccentricity of the distance zone is between 0.5 and 0.7.

18. A contact lens or an intraocular lens, the lens having a near zone and a distance zone concentrically surrounding the near zone, the near zone having an elliptical-aspherical surface having a near zone eccentricity, the distance zone having an elliptical-aspherical surface having a distance zone eccentricity, and wherein the near zone eccentricity is less than the distance zone eccentricity.

* * * * *